United States Patent [19]

D'Aria et al.

[11] Patent Number: 4,928,288
[45] Date of Patent: May 22, 1990

[54] DECODING METHOD AND DEVICE WITH ERASURE DETECTION FOR MULTILEVEL TRANSMISSION SYSTEMS

[75] Inventors: Giovanna D'Aria, Matera; Giorgio Taricco, Turin, both of Italy

[73] Assignee: Societa' Italiana per L'Esercizio Delle Telecomunicazioni P.A., Turin, Italy

[21] Appl. No.: 288,401

[22] Filed: Dec. 21, 1988

[30] Foreign Application Priority Data

Dec. 22, 1987 [IT] Italy .............................. 68104 A/87

[51] Int. Cl.$^5$ ............................................. H04L 1/20
[52] U.S. Cl. .................................... 375/17; 371/37.5; 375/104
[58] Field of Search ........................... 375/17, 34, 104; 455/223; 358/314, 336; 360/38.1; 371/31, 37, 40, 43, 45, 37.5, 40.2; 307/360, 361

[56] References Cited
U.S. PATENT DOCUMENTS 4,339,823  7/1982  Predina et al. ........................ 375/20

OTHER PUBLICATIONS

IBM Journal of Research Development, vol. 28, No. 2, Mar. 1984, pp. 150–158; "A Universal Reed-Solomon Decoder", Richard E. Blahut.

Primary Examiner—Benedict V. Safourek
Attorney, Agent, or Firm—Herbert Dubno

[57] ABSTRACT

In the receiver of a multi-level signal transmission system an unreliability signalling is generated for a decided channel symbol whenever the value of the sample originating said symbol lies within value regions comprising each decision threshold. Unreliability signallings relevant to each code symbol are counted and the existence of an erasure is signalled to the decoder when the number of unreliable channel symbols exceeds a predetermined number. The number of erasures in a codeword is also counted and erasure correction is disabled in the decoder when such a number exceeds a predetermined value.

13 Claims, 2 Drawing Sheets

DECODING METHOD AND DEVICE WITH ERASURE DETECTION FOR MULTILEVEL TRANSMISSION SYSTEMS

FIELD OF THE INVENTION

The present invention refers to multilevel transmission systems and, more particularly, to a decoding method and device with erasure detection, to be used in a receiver of such a system.

The invention is applicable to digital transmission systems, such as mobile radio systems.

BACKGROUND OF THE INVENTION

It is known that digital transmission system performance can be improved by the use of codes admitting error correction by decoders at the receiving side. This allows either bit error rate reduction for a given power of the transmitted signal, or transmission with reduced power for a given bit error rate. The latter possibility is of great interest for applications as the one above, and the so-called "coding gain" (i.e. the decrease of ratio Eb/No between the energy transmitted per bit and the power of Gaussian white noise) expresses the performance improvement achieved.

It has already been described in the literature that error correcting codes of the FEC type (FEC=Forward Error Correction, i.e. correction without block repetition) afford a certain coding gain in case of mobile radio systems, and that by supplying the decoder with some information on the channel state, performance can also be improved in terms of bit error rate. More particularly the papers entitled "Performance and burst error characteristics of PAM/FM modulations in mobile radio channels" presented by G. D'Aria, G. Taricco and V. Zingarelli at IEEE Global Telecommunications Conference, Houston (USA), 1-4 Dec. 1986, paper 31.4, pages 1110-1114, and "Burst error characteristics of narrowband digital systems in land mobile radio" presented by the same authors at the 36th IEEE Vehicular Technology Conference, Dallas (USA), 20-22 May 1986, pages 443-451, suggest that all errors (symbol substitutions) should be considered as erasures, i.e. the decoder should receive no information on the symbol actually present in a given location.

This suggestion is based on the fact that considering a location within a a codeword as an erasure can improve decoder correction capability, if such a location actually corresponds to an error. In fact an error correcting code with Hamming distance D can correct errors and erasures such that $2E+C \leq D-1$, where E is the number of errors and C the number of erasures. Hence, if $C=0$, $(D-1)/2$ errors at most can be corrected, whereas if $C=2$ and the erasures correspond to erroneous symbols, $(D-3)/2+2=(D+1)/2$ errors at most can be corrected, with an actual improvement in the correction capability. This capability is, by contrast, reduced if an erasure corresponds to a correct symbol, since the decoder can correct only $(D-2)/2=D/2-1$ errors. Generally speaking, if the doctor has been signalled $C=C'+C''$ erasures, $C'$ corresponding to erroneous symbols and $C''$ corresponding to correct symbols, the decoder can correct up to $(D-1-C'-C'')/2+C'=(D-1+C'-C'')/2$ errors, with improved performance if $C'>C''+1$ (with odd D). In the ideal case in which all errors can be detected as erasures and there are no erasures in correspondence with correct symbols ($E=0$, $C''=0$), it is clear that correction capability will be doubled.

The cited papers do not give any indication on how detection of at least some errors as erasures can be obtained practically.

OBJECT OF THE INVENTION

The object of the present invention is to provide a method and a device allowing the practical implementation of such a detection.

SUMMARY OF THE INVENTION

The method, according to the invention, of decoding multilevel signals, which are coded according to a code allowing error and erasure correction and are transmitted as words consisting each of a plurality of code symbols each comprising in turn a plurality of channel symbols, comprises sampling the signals received and comparing the samples with decision thresholds so as to obtain a succession of such channels symbols which are supplied to decoding means. Each of the decision thresholds is associated with a pair of supplementary thresholds delimiting a value region within which the decision threshold lies. Whenever the value of a received signal sample falls in one of these regions, an unreliability signal is generated for the channel symbol obtained from such a sample and, when the number of unreliable channel symbols in a code symbol exceeds a first predetermined number, a signal is generated informing the decoding means of the existence of an erasure in correspondence with the code symbol itself.

The method takes into account the fact that the highest probability of making errors is found in correspondence with signals whose value, at the decision instant, is close to one of the decision thresholds. Hence, by signalling the existence of erasures whenever a code symbol comprises one or more channel symbols obtained from samples whose value is comprised within a region of suitable amplitude, adjacent to a decision threshold, there is a high probability that such erasures actually correspond to errors, and hence an actual improvement in the system performance is obtained, as mentioned above.

According to another feature of the invention, a signal disabling erasure correction by the decoding means is generated whenever the number of erasures in a codeword exceeds a second maximum predetermined number.

From the foregoing it is evident that in any case there is an upper limit to the number of erasures the code can correct in the absence of other errors, and such a limit is $D-1$. Once that limit has been exceeded, the only thing to do is to signal the impossibility of decoding the word. It is then convenient that the second maximum number be lower than said limit, so as to allow also the correction of possible errors which are not signalled as erasures, and it is also advantageous for that number to be comprised in a neighborhood of the maximum number of errors which can be corrected by the code in the absence of erasures, i.e. in a neighborhood of $(D-1)/2$.

The invention includes also the device for implementing the method. Such a device comprises a threshold decision device sampling the signals received, comparing the samples with decision thresholds, obtaining a channel symbol for each sample, and supplying a decoder with such channel symbols, through a first output connection. The decision device also has a second output on which an unreliability signalling for the channel symbol present on the first output is emitted whenever the value of the sample which has originated the symbol falls within value regions each comprising one of the decision thresholds and being delimited by a respective pair of supplementary thresholds, the second output being connected to a device recognizing the unreliability signalling, comprising means for counting the number of unreliable channel symbols in a code symbol and informing the decoder of the presence of an erasure when such number of unreliable channel symbols exceeds a first maximum number.

According to a further feature of the invention, the unreliability-signal recognizing device further comprises means for counting the number of erasures in a codeword and for generating and sending the decoder a signal disabling the correction of erasures when the number of erasures in a codeword exceeds a second maximum number.

BRIEF DESCRIPTION OF THE DRAWING

A preferred embodiment of the invention will be now described with reference to the annexed drawing in which.

SPECIFIC DESCRIPTION

By way of example, hereinafter reference will be made to a mobile radio system, using a 4-level PAM/FM modulation (pulse amplitude modulation/frequency modulation) and Reed-Solomon coding with forward error correction. A codeword will be assumed to comprise 63 code symbols, namely 45 information symbols and 18 parity symbols, each code symbol being represented by three channel symbols, each consisting of 2 bits; for such a code, the minimum Hamming distance is 19.

Figure 1:
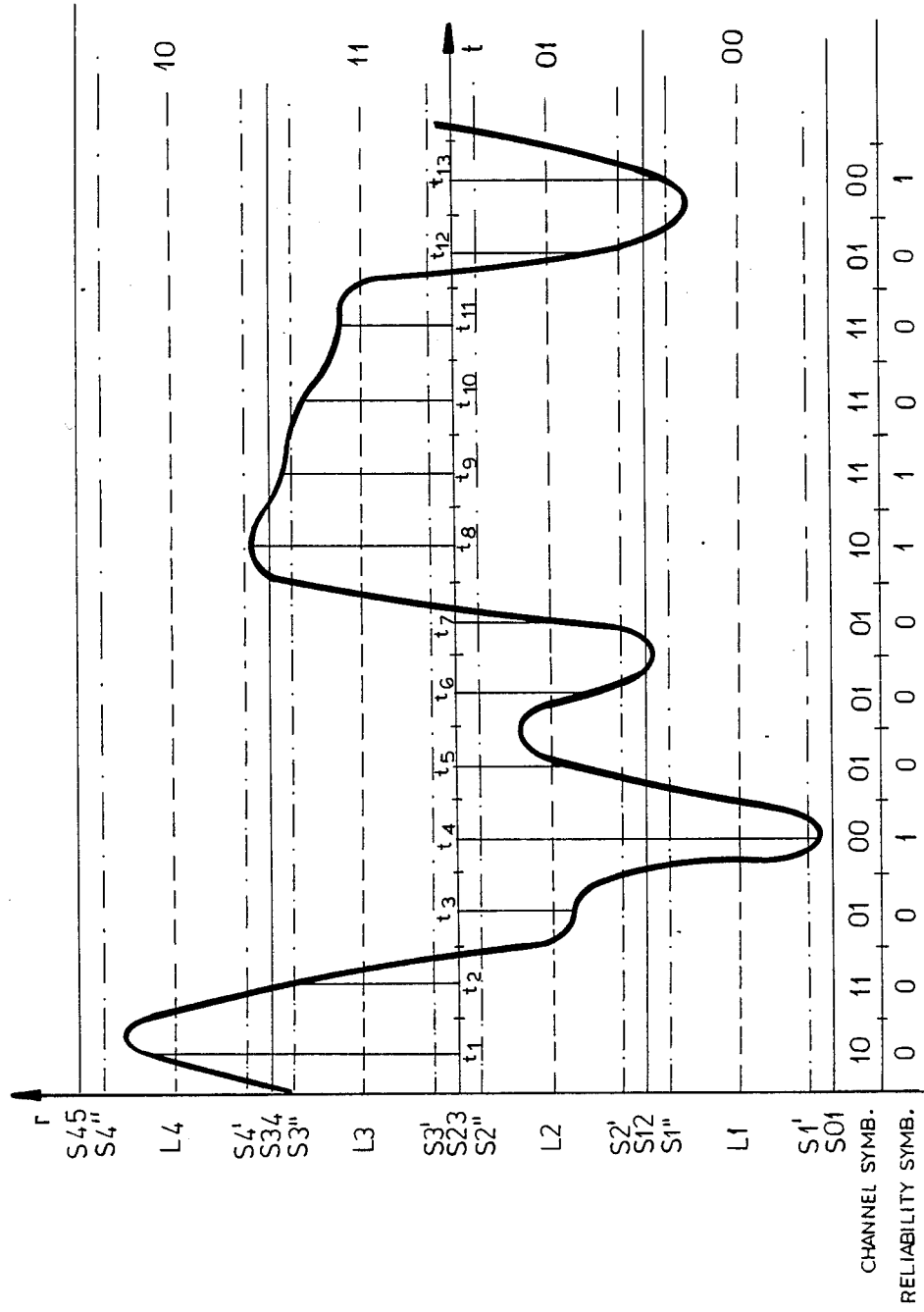
FIG. 1 is a diagram showing the method of the invention.

FIG. 1 shows by way of example a waveform corresponding to a portion of a codeword received, and more particularly a waveform wherefrom a decision device obtains the sequence of channel symbols 10, 11, 01, 00, 01, 01, 01, 10, 11, 11, 11, 01, 00. The received signal amplitude r is plotted along the ordinate, and time t is plotted along the abscissa. That sequence is supposed to comprise four complete code symbols plus the first channel symbol of a fifth code symbol. References t1, t2, t3 ... t13 denote the various decision instants; dashed lines L1, L2, L3, L4 denote the four modulation levels, and solid lines S12, S23, S34 represent the conventional decision thresholds with which the waveform received is compared at said instants. Such thresholds, hereinafter referred to as "main thresholds", lie e.g. midway between adjacent levels.

According to the present invention, each main threshold S12, S23, S34 is associated with a pair of supplementary thresholds S1″ and S2′, S2″ and S3′, and S3″ and S4′, respectively, symmetrical with respect to the corresponding main threshold and placed at a distance $\epsilon$ from it. Two further supplementary thresholds S1′, S4″ are also provided, the first placed at a distance $\epsilon$ above a lowermost threshold S01 and the second placed at a distance $\epsilon$ below an uppermost threshold S45. The value regions comprised between two supplementary thresholds associated with the same main threshold, or between the lowermost or uppermost thresholds and the associated supplementary threshold, will be hereinafter referred to as "unreliability regions." Whenever the value of the sample of the received signal falls within one of these unreliability regions, a suitable signal is generated, which in the simplest case will consist of one bit, e.g. at logic level 1.

In the case of the waveform represented in FIG. 1, unreliability occurs at decision instants t4, t8, t9, t13. The bit indicating reliability or unreliability of the various channel symbols is written in the bottom line (Reliability symb.) of the Figure, below the value of the corresponding symbol.

The unreliability signallings relevant to all channel symbols belonging to a same code symbol are counted, and, if their number exceeds a first maximum number, an erasure is signalled to the decoder in correspondence with such a code symbol. The number of erasures in a word is also counted and, when such a number exceeds a second maximum number, erasure correction is inhibited. Under these conditions, decoding means will carry out error correction only.

The width of the unreliability regions obviously affects the system performance, since when this width varies, the number of erasures taken into consideration and hence the number of those actually corresponding to errors will also vary. Measurements of the error rate have proved that an optimum value exists for the ratio (normalized width) between the width of the unreliability regions and the distance between adjacent levels, which value minimizes the error rate downstream the decoder. This value is of the order of 0.10–0.15.

An optimum value exists also for the maximum number of erasures in a word, such a value depending on the value of the normalized width of the unreliability regions. Experimental measurements have proved that such a value falls in an interval comprising the maximum number of errors which can be corrected by the decoding means in the absence of erasures, i.e. $(D-2)/2$.

Figure 2:
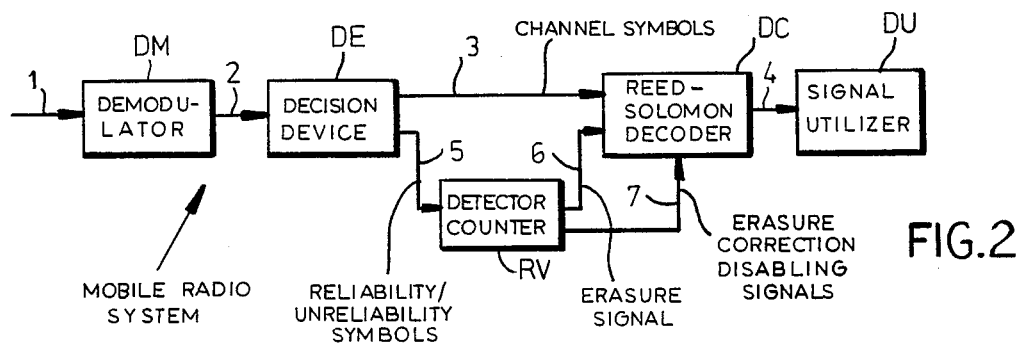
FIG. 2 is block diagram of a multilevel digital-transmission system receiver incorporating the invention.

FIG. 2 shows the receiver of a multilevel transmission system wherein the above method is employed. Such a receiver comprises, like the conventional receivers:

a demodulator DM, connected to transmission channel 1 conveying signals modulated and encoded as mentioned above; the operations of DM ar not a concern of the invention and hence, with reference to the exemplary application considered, DM can be a demodulator for PAM/FM signals of any known type;

a decision device DE which receives through a connection 2 the demodulated signals, samples them, compares the samples with thresholds and supplies on an output 3 the channel symbols obtained as a result of the comparison; and a decoder DC, which receives the symbols outgoing from DE, decodes the codewords by correcting errors and erasures, and supplies the decoded signals to utilizing devices DU, through a connection 4.

To implement the invention, decision device DE, besides output 3, onto which the decided channel symbols are sent, has a second output 5 on which the bit indicating reliability or unreliability of the decided symbol is emitted. Such an output is connected to a device RV which, when the number of unreliable channel symbols in a code symbol exceeds a predetermined value, emits on a first output 6, connected to decoder DC, a signal indicating that in correspondence with such a symbol there is an erasure.

In the particular examples of code and application indicated above, it is advantageous, from the system performance standpoint, that an erasure is signalled when there is at least one unreliable channel symbol within a code symbol.

Device RV comprises also means for counting the number of erasures in a codeword and generates on a second output 7, connected to decoder DC, a signal for disabling erasure correction in decoder DC when such a number exceeds a predetermine value.

It is worth noting that decoding with error and erasure correction is carried out in a quite conventional way, and hence decoder DC can be a Reed-Solomon decoder of any known type.

Figure 3:
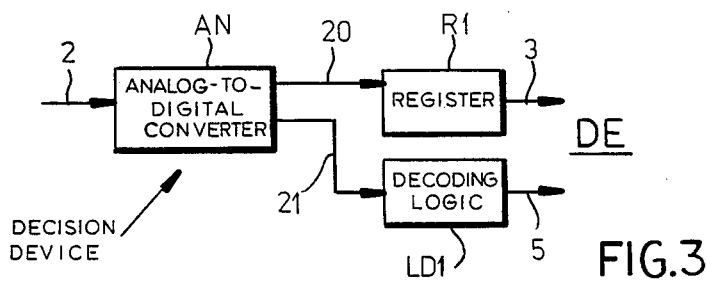
FIG. 3 is a block diagram of an exemplary embodiment of the decision device.

As shown in FIG. 3, a decision device DE carrying out the operations above can basically consist of an analog-to-digital converter AN having linear characteristics for values of the analog input signal comprised between S01 and S45 and emitting an n-bit digital output signal. The two most significant output bits form the decided channel symbol and the others are used to generate the reliability-unreliability bit. Said two most significant bits are emitted in parallel on the two wires of a connection 20, and are sent to a register R1, which temporarily memorizes the three decided channel symbols belonging to a same code symbol. Register R1 is necessary to let detector RV recognize a possible erasure. The output of R1 forms output 3 of DE. By contrast, the least significant bits are sent, through a connection 21 with n-2 wires, to a decoding logic LD1 emitting a logic 1 on wire 5 in correspondence with configurations corresponding to unreliable symbols.

By way of example hereinafter the case is disclosed wherein converter AN emits 8 bits (i.e. the region comprised between two adjacent main thresholds is subdivided into 64 intervals) and distance ϵ is equal to three such intervals. The intervals beginning with levels L1, L2, L3, L4 are allotted configurations 00100000, 01100000, 10100000, 11000000. The received signals whose value ranges between S01 and S12 will be represented by bit configurations 00000000 to 00111111, and they will be given by DE (FIG. 2) channel symbol 00; the signals comprised between S12 and S23 by configurations 01000000 to 01111111 (channel symbol 01), those comprised between S23 and S34 by configurations 10000000 to 10111111 (channel symbol 10), those comprised between S34 and S45, by configurations 11000000 to 11111111 (channel symbol 11). Configurations 00000000 and 11111111 will be used also for signals with a value lower than S01 or a valve higher than S45, respectively. It can immediately be seen that samples producing unreliable channel symbols, whatever the value of such symbols, will have for the least significant bits configurations 000000, 000001, 000010, if their values fall between a main threshold and the supplementary threshold immediately above, and configurations 111101, 111110, 111111, if their values are comprised between a main threshold and the supplementary threshold immediately below. Obviously, lowermost and uppermost thresholds are considered to be like the decision thresholds.

The design of a decoding network operating on this principle presents no problem to the worker skilled in the art, whatever the number n of bits outgoing from AN and whatever the distance ϵ.

Figure 4:
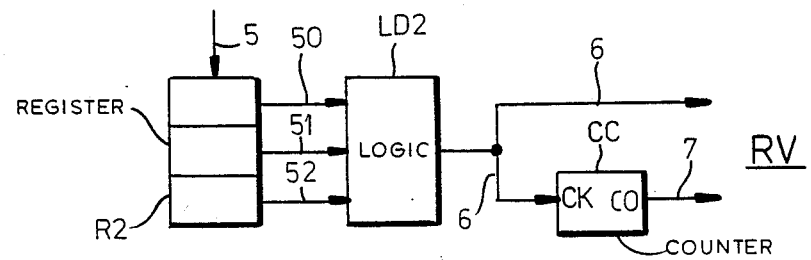
FIG. 4 is a block diagram of an exemplary embodiment of the erasure detecting device.

In FIG. 4, detector RV is shown to comprise a register R2 for temporary storage of the three reliability/unreliability bits associated with a same code symbol. These bits can be written in series and read in parallel. Through wires 50, 51, 52, the bits read in R2 are sent to a second decoding network LD2 which, on the basis of the reliability/unreliability bit configuration associated with a code symbol, emits on output 6 the possible erasure indication, which will also consist of a bit at 1. Under the hypothesis that the existence of an erasure is signalled when the code symbol presents at least one unreliable channel symbol (and hence when in R2 there is at least one bit at 1), logic LD2 can consist of a simple OR gate.

Output 6 of LD2 is also connected to the clock input of a presettable counter CC, which is reset at each new codeword and which counts the number of erasures inside each codeword (i.e. the number of bits at 1 emitted on wire 6) up to the attainment of the preset value; the end-of-counting signal of CC is emitted on wire 7 as a signal disabling erasure correction in DC.

FIGS. 2 to 4 do not show the control and/or timing signals for the various devices. These signals can be easily deduced from the description above.

The operation of the device according to the invention will be now briefly described, by referring again to the waveform of FIG. 1 and by supposing for simplicity that the five symbols indicated are the first five symbols of a word, and that the maximum number of erasures which can be corrected is just (D-1)/2, i.e. 9 with the code above. In this description no assumption will be made on whether the erasures due to symbol unreliability actually correspond to errors.

The signal received through channel 1 (FIG. 2) is demodulated in DM and transferred to decision device DE. At instance t1, t2, t3 (FIG. 1) the decisions are taken for the three channel symbols of the first code symbol. As shown, signal sample amplitudes at those three instants fall between S34 and S45 (and more precisely between L4 and S4″) and respectively between S23 and S34 (and more precisely between L3 and S3″) and between S12 and S23 (and more precisely between S2′ and L2). The digital conversion carried out by analog-to-digital converter AN (FIG. 3) will then give in succession on wires 20 bit pairs 10, 11, 01. Since none of the three samples falls in an unreliability region, the three bit configurations emitted in succession by analog-to-digital converter AN on wires 21 and decoded in decoding logic LD1 will rise to three bits 0 on wire 5. The three decided channel symbols are temporarily stored in register R1, while the three bits (from wires 21) are loaded into register R2 (FIG. 4) of the reliability/unreliability detector/counter RV. Once the three reliability/unreliability bits associated with the first code symbol have been loaded, the content of register R2 is decoded in decoder logic LD2. Since the three bits are all zero, (no unreliability) decoding gives rise to a zero on wire 6. Counter CC remains at 0 and there is no signal on wire 7.

In the subsequent code symbol (decision instants t4, t5, t6) the sample originating the first channel symbol has a value comprised between S01 and S1′. The six least significant bits of the bit configuration present at the output of analog-to-digital converter AN (e.g. configuration 00000001), decoded in decoder logic LD1, cause the emission of a logic 1 over wire 5 to indicate that the channel symbol (00) decided at that instant is unreliable. By contrast the values of the samples originating the remaining two channel symbols (both consisting of bit pair 01) do not lie in an unreliability region, and hence LD1 emits again a zero on wire 5 in correspondence with both of them. Then configuration 100 is present in register R2 for the reliability/unreliability bits, and this configuration, decoded in decoder logic LD2, causes the emission on wire 6 of a logic 1 informing decoder DC of the existence of an erasure and advancing counter CC to 1. Since the count of counter CC is less than 9, the signal on wire 7 remains 0.

In the third code symbol, the channel symbol obtained at instant t7 is reliable, while at instants t8, t9 there are again two unreliable channel symbols, since the amplitudes of the samples fed to decision device DE at those instants fall in the unreliability regions between S34 and S4' and between S3" and S34, respectively. Then bit sequence 011 is present on wire 5 and that sequence, stored in register R2 and decoded in decoder logic LD2, causes again the emission of a 1 on wire 6, in order to signal an erasure in correspondence with the code symbol. This 1 advances counter CC to 2. The count is still less than 9, and hence the signal on wire 7 remains at 0.

In the fourth code symbol the three channel symbols are again all reliable, and the situation of the first code symbol occurs again. The channel symbol decided at instant t13 is, by contrast, again unreliable, and hence for the fifth code symbol there will be again the situation depicted for the second and third symbols.

The operations repeat identically for the subsequent symbols in the word, and counter CC will be stepped by 1 whenever a code symbol presents an unreliable channel symbol. If counter CC does not attain value 9 during the operations concerning a word, the signal on wire 7 remains. Once all the symbols of a word have been received, decoder DC will carry out the decoding by correcting the erasures. If, by contrast, counter CC attains value 9, a signal is emitted on wire 7 thereby disabling erasure correction in decoder DC. During decoding DC will then correct only the errors, if any. At the end of the word, the signal on wire 7 will be reset to zero and decoder DC is ready to receive the new word.

Figure 5:
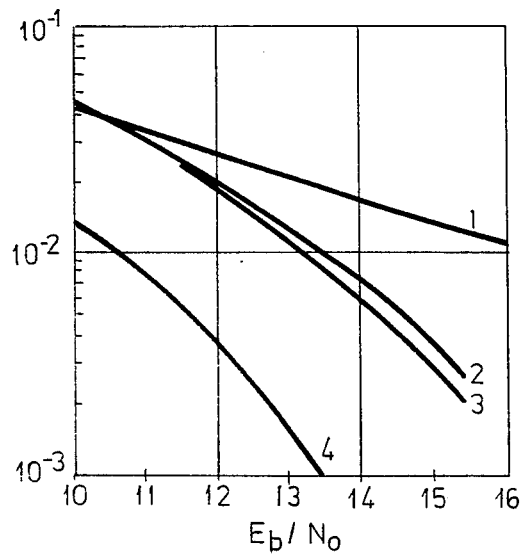
FIG. 5 is a diagram of the performance of a mobile radio system, in the presence and in the absence of the invention.

The diagram of FIG. 5 shows the error rate (BER) versus ratio Eb/No at the receiver output for the cases of uncoded transmission (curve 1), transmission using the error correcting code only (curve 2), and transmission using the present invention (curve 3). In this case values 0.15 and 9 have been chosen for the normalized width of unreliability regions and for the maximum number of erasures in a word, repectively. Curve 4 on the contrary refers to the ideal case in which all errors have been detected as erasures, and no erasures have been signalled in correspondence with correct symbols. As seen, by the use of the invention, an improvement has been obtained of about 0.3 dB with respect to the use of the only error correcting code.

It is clear that what described has been given only by way of non limiting example and that variations and modifications are possible without going out of the scope of the invention. In particular, various configurations are possible for converter AN and detector/counter RV (e.g. in the latter, R2 and LD2 can be replaced by a programmable counter like counter CC, reset at each code symbol).

Besides, the same principle can be applied to different modulations, e.g. phase modulation, provided the decision unit operates by comparison with thresholds. Still further, the same principle can be applied in systems exploiting also channel memory. In the latter case a system performance improvement is obtained, although with increase in receiver complexity.

We claim:

1. A method of decoding multilevel signals and transmitting words each consisting of a plurality of code symbols which, in turn, comprise channel symbols, said method comprising the steps of:
   (a) assigning respective decision thresholds to a levels of a multilevel signal corresponding to respective channel symbols;
   (b) sampling an incoming multilevel signal to form a multiplicity of samples and comparing said samples with said decision thresholds to obtain a succession of said channel symbols from said incoming multilevel signal;
   (c) supplying said succession of channel signals to an error correcting decoder outputting a utilizable decoded signal as a respective decoded word for each incoming multilevel signal;
   (d) assigning to each of said decision thresholds a pair of supplementary thresholds defining a respective value region within which the respective decision threshold lies;
   (e) generating an unreliability signal whenever said samples fall within a respective one of said value regions and indicating an unreliable channel symbol for the respective code symbol; and
   (f) counting said unreliability signals for each of said code symbols and transmitting to said decoder a signal representing the existence of an erasure when the number of said unreliability signals for a respective code symbol exceeds a first predetermined number.

2. The method defined in claim 1 wherein two further supplementary thresholds are provided associated with an uppermost one of said decision thresholds and a lowermost one of said decision thresholds respectively to define two further value regions extending up to said uppermost threshold and down to said lowermost threshold, and wherein an unreliability signal is generated whenever a sample falls within a respective one of said further value regions.

3. The method defined in claim 1 wherein a signal representing the existence of an erasure is generated whenever a code symbol comprises at least one unreliable channel symbol.

4. The method defined in claim 1, further comprising the steps of:
   (g) counting the number of erasures in a code word; and
   (h) displaying erasure correction by said decoder when the counted erasure number for a codeword exceeds a second predetermined number.

5. The method defined in claim 3 wherein said supplementary thresholds are all at the same distance from a respective decision threshold, said distance being a distance minimizing signal-to-noise ratio for the decoded incoming multilevel signal.

6. The method defined in claim 3 wherein said second predetermined number, for a given value of said distance, corresponds to a maximum number of errors which can be corrected by said decoder in the absence of erasures.

7. A system for decoding multilevel signals and transmitting words each consisting of a plurality of code symbols which, in turn, comprise channel symbols, said system comprising:
    means for assigning respective decision thresholds to a levels of a multilevel signal corresponding to respective channel symbols;
    means for sampling an incoming multilevel signal to form a multiplicity of samples and comparing said samples with said decision thresholds to obtain a succession of said channel symbols from said incoming multilevel signal;
    an error correcting decoder receiving said succession of channel signals and outputting a utilizable decoded signal as a respective decoded word for each incoming multilevel signal;
    means for assigning to each of said decision thresholds a pair of supplementary thresholds defining a respective value region within the respective decision threshold lies;
    means for generating an unreliability signal whenever said samples fall within a respective one of said value regions and indicating an unreliable channel symbol for the respective code symbol; and
    means for counting said unreliability signals for each of said code symbols and transmitting to said decoder a signal representing the existence of an erasure when the number of said unreliability signals for a respective code symbol exceeds a first predetermined number.

8. The system defined in claim 7 wherein:
    said means for sampling includes a threshold decision device sampling said incoming multilevel signal and comparing said samples with said decision thresholds, obtaining a channel symbol for each sample;
    said decision device has a first output connection for supplying said channel symbols to said decoder;
    said decision device has a second output connection on which a signal indicating unreliability of the channel symbol on said first output connection is emitted whenever the value of the sample which has originated the respective channel symbol is within one of said value regions; and
    said means for counting includes a device recognizing said signal indicating unreliability, connected to said second output connection and comprising means for counting a number of unreliable channel symbols in a code symbol and informing said decoder of existence of an erasure.

9. The symbol defined in claim 8 wherein said decision device emits an unreliability signal whenever a sample falls in a value region extending up to an uppermost threshold, down to a lowermost threshold, is higher than said uppermost threshold or is lower than said lowermost threshold.

10. The symbol defined in claim 9 wherein said device for recognizing said signal indicating unreliability further comprises means for counting the erasure within a codeword and for generating and transmitting to said decoder a signal for disabling the correction of erasures when the number of erasures in a codeword exceeds a second predetermined number.

11. The symbol defined in claim 10 wherein said incoming multilevel signal is an amplitude modulated signal and said decision device is an analog-to-digital converter with linear characteristics between said lowermost and uppermost thresholds and emitting bit patterns with most significant bits forming the channel symbol and remaining bits, and a decoding logic network receiving said remaining bits and emitting said unreliability signal when said remaining bits have a configuration corresponding to values in said value regions.

12. The symbol defined in claim 11 which forms part of a mobile radio system.

13. The symbol defined in claim 11 wherein said decoder is a Reed-Solomon decoder.

* * * * *